US010707724B2

(12) United States Patent
Meyer

(10) Patent No.: US 10,707,724 B2
(45) Date of Patent: Jul. 7, 2020

(54) COUNTER ROTATING ELECTRICAL GENERATOR

(71) Applicant: Detlef Willi Meyer, Hannover (DE)

(72) Inventor: Detlef Willi Meyer, Hannover (DE)

(73) Assignee: New Energy Systems, LLC, Quincy, IL (US)

( * ) Notice: Subject to any disclaimer, the term of this patent is extended or adjusted under 35 U.S.C. 154(b) by 242 days.

(21) Appl. No.: 15/706,606

(22) Filed: Sep. 15, 2017

(65) Prior Publication Data

US 2018/0076689 A1 Mar. 15, 2018

Related U.S. Application Data

(60) Provisional application No. 62/495,455, filed on Sep. 15, 2016.

(51) Int. Cl.
*H02K 7/18* (2006.01)
*F03D 3/06* (2006.01)
*F03D 9/25* (2016.01)
*H02K 16/00* (2006.01)

(52) U.S. Cl.
CPC ............. *H02K 7/183* (2013.01); *F03D 3/065* (2013.01); *F03D 9/25* (2016.05); *H02K 16/005* (2013.01)

(58) Field of Classification Search
CPC ........ H02K 7/183; H02K 16/005; F03D 9/25; F03D 3/065
See application file for complete search history.

(56) References Cited

U.S. PATENT DOCUMENTS

| | | | | |
|---|---|---|---|---|
| 3,985,110 A * | 10/1976 | Doundoulakis | ......... | F01C 1/073 123/215 |
| 5,210,452 A * | 5/1993 | Pratap | ...................... | H02K 3/00 310/12.12 |
| 5,506,453 A * | 4/1996 | McCombs | .............. | F03D 1/025 290/44 |
| 6,278,197 B1 * | 8/2001 | Appa | ...................... | F03D 1/025 290/55 |
| 7,352,073 B2 * | 4/2008 | Ames | ...................... | F03B 13/12 290/42 |
| 8,358,030 B2 * | 1/2013 | Plaskove | ................... | F03D 3/02 290/55 |
| 2001/0045790 A1 * | 11/2001 | Whitesell | ............. | H02K 16/025 310/236 |
| 2004/0096327 A1 * | 5/2004 | Appa | ...................... | F03D 1/025 416/1 |
| 2009/0224617 A1 * | 9/2009 | Bottger | .................. | H02K 1/146 310/89 |
| 2010/0164321 A1 * | 7/2010 | Shim | ...................... | H02K 16/02 310/273 |
| 2011/0049894 A1 * | 3/2011 | Green | ..................... | F03D 3/005 290/52 |

(Continued)

*Primary Examiner* — Emily P Pham
(74) *Attorney, Agent, or Firm* — QPatents

(57) ABSTRACT

A counter rotating electrical generator has concentric rotors that rotate in opposite directions. One rotor has windings and rotates in a first direction. The other rotor rotates in the opposite direction and creates a magnetic field. The windings of the first rotor cut through the magnetic field of the other rotor rotating in the opposite direction, thus creating an electric potential. The counter rotating electrical generator may be configured to produce alternating current or direct current.

15 Claims, 1 Drawing Sheet

(56) References Cited

U.S. PATENT DOCUMENTS

2014/0008915 A1* 1/2014 Ribarov .................. F03D 1/025
　　　　　　　　　　　　　　　　　　　　　　　290/55
2015/0292480 A1* 10/2015 Pawar ..................... F03D 9/12
　　　　　　　　　　　　　　　　　　　　　　　416/146 R

* cited by examiner

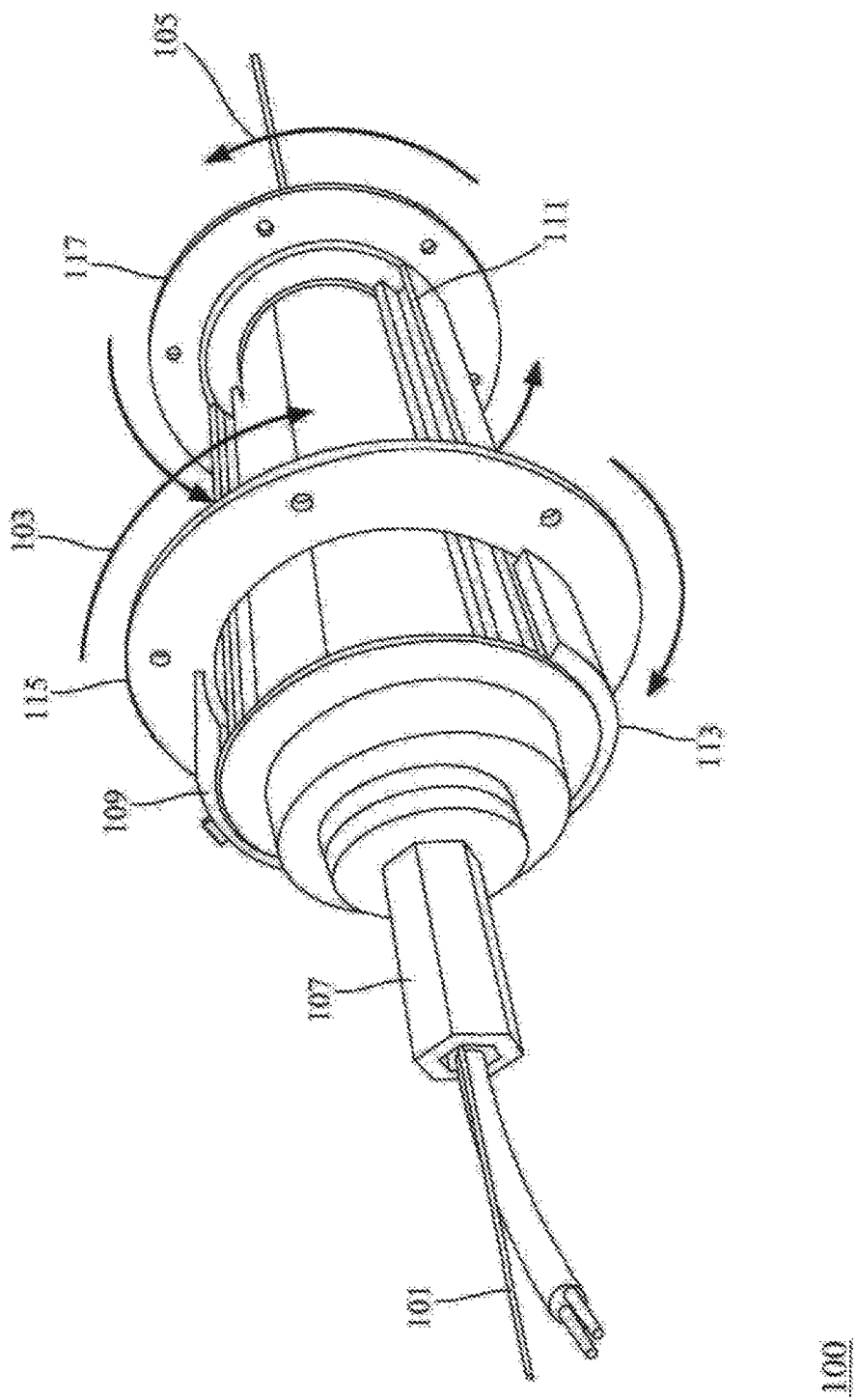

COUNTER ROTATING ELECTRICAL GENERATOR

CROSS-REFERENCE TO RELATED APPLICATIONS

The present application claims priority from, and incorporates by reference in its entirety, U.S. provisional patent application 62/495,455 filed Sep. 15, 2016.

BACKGROUND

Technical Field

Various embodiments of the present invention relate to electric equipment, and more specifically, to electrical generator for generating electricity.

Description of Related Art

Various sources of mechanical force or energy can be used to drive electric generators. For example, wind turbines have blades that translate the mechanical force of wind into rotational mechanical torque to drive electric generators. The principle of converting mechanical power into electric power is the same for all electric generators that use electrical induction. Mechanical power is supplied to the generator in the form of a rotating mechanical shaft. The conversion is based on the Lorentz force acting on moving electric charges in a magnetic field. If a conductor moves transversely—that is, perpendicularly—through the magnetic field, the Lorentz force acts on the charges in the conductor in the direction of this conductor and sets them in motion. This charge displacement causes a potential difference and generates an electrical voltage between the ends of the conductor. The greater the change in the area per time change (traverse distance of the conductor), the higher the voltage. To increase the voltage, several conductors connected in series in the form of a coil are used.

Both electrically-powered motors or and electrical generators include a stator and a rotor. The stator is the fixed component—typically the outer casing. In the case of motors, electrical energy is converted into mechanical energy. For generators, the effect is reversed and mechanical energy is converted into electricity. The rotor is the moving (rotating) part of a motor or generator. Conventional generators may be equipped with either an internal rotor or an external rotor. Both internal rotor generators and external rotor generators include a stator, the fixed component of a generator. However, conventional generators have only a single rotor that rotates about the central axis in one direction.

Three different types of rotational generators are common in the generation of electricity: multi-phase current (e.g., three-phase current), alternating current and direct current. Conventional generators for each of these three types of electricity have a rotor and a stator.

BRIEF SUMMARY

The present inventor recognized the possibility of making an electrical generator that is more efficient than conventional electrical generators. The various embodiments disclosed herein achieve these goals, and others which will become readily apparent.

The various embodiments disclosed herein involve technical innovation in the field of the electricity generation. Various embodiments disclosed herein have at least two rotors—one that creates a rotating magnetic field and another configured with windings to cut across the magnetic field, thus generating electricity. As a result of the mode of operation of the counter rotating rotary generator, the amount of flux lines passing through the windings is doubled as compared to conventional generators provided with rotor and stator. This effect increases the current voltage compared to unilaterally rotating generators.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. In the drawings:

FIG. 1 depicts an oblique cutaway view of a counter rotating electrical generator according to various embodiments disclosed herein.

DETAILED DESCRIPTION

The mode of operation of the counter-rotating rotary generator for generating electrical energy is similar to that of conventionally designed rotary generators inasmuch as the loops of conductive windings pass through a magnetic field (or vice versa) causing a difference in electrical potential between the ends of the conductor.

FIG. 1 depicts an oblique cutaway view of a counter rotating electrical generator 100 according to various embodiments disclosed herein. In the FIGURE, 103 is the clockwise direction of rotation about central axis 101, and 105 is the counter-clockwise direction of rotation about central axis 101.

The counter-rotating rotary generator 100 for generating electrical energy differs from conventional generators by its construction. The counter-rotating generator 100 has two or more hollow-chamber rotors 109 and 111 that rotate in opposite directions. For example, the first (outer) hollow-chamber rotor 109 shown in FIG. 1 rotates in the clockwise direction 103 and contains one or more magnets 113 for generating a magnetic field. The magnets 113 may be permanent magnets or electromagnets. The second (inner) hollow-chamber rotor 111 shown in FIG. 1 rotates in the counter-clockwise direction 105 and is equipped with windings that pass through the magnetic field of the magnet. This creates a potential between the ends of the windings, thus generating electricity. This novel design makes is considerably different from conventional generators with a single rotor that rotates in only one direction.

The outer hollow-chamber rotor 109 may be connected to a first flange 115, and the second hollow-chamber rotor 111 may be connected to a second flange 117. The two flanges are typically configured to be connected to sources of rotational mechanical torque. For example, wind turbines may be connected to each flange with the blades of the wind turbines oriented to provide rotational torque in opposite rotational direction to the respective flanges 115 and 117—e.g., clockwise rotational force to flange 115 and counter-clockwise force to 117.

The different modes of operation of three-phase alternating current or direct current generators can be used in the counter-rotating rotary generator for generating electrical energy. The design of the alternatingly rotating generator makes it possible to block the different and necessary components which are necessary for the generation of electrical energy in the mode of operation of the different processes, e.g., rotary alternating or direct current. The rotors 109 and 111 are concentrically oriented, with the first rotor 109 being located outside of, and concentric to, the second inner rotor 111. They may be separated by at least two oblique ball bearings on the central axis.

The center shaft 107 is positioned about a central axis 101. In various embodiments the center shaft 107 is fixed—that is, it does not rotate relative to the generator itself (e.g., relative to the case of the generator or relative to the earth if the generator is fastened to the earth or otherwise stationary). In other embodiments the center shaft 107 is configured to rotate with one of the rotors of the generator. The central region of the central hollow shaft is typically a round-shaped hollow space at least the length of the rotors. It allows the rotors, which are located above them, to be rotated in opposing directions on the center shaft 107, which are separated by ball bearings, roller bearings, or other such mechanisms for reducing friction. The center shaft 107 is typically formed in a multi-edged manner, the six sided center shaft depicted in FIG. 1. This shaping allows a rigid and fixed connection to other fasteners.

At least two magnets 113 with south and north poles may be located on the outer hollow chamber rotor 109 configured to rotate about the central axis. The magnets 113 may be permanent magnets or electromagnets. In the interior of the rotor, the oblique ball bearings for rotation may be inserted into the bushings located on the left and right sides.

Two or more field coils may be located on the inner walls of the outer hollow-chamber rotor 109. These field coils generate a magnetic field for generating electrical energy. A socket may be located at the end of the outer hollow-chamber rotor. Contact rings for the current removal may be located behind the receiving flange. For rotor blades or turbines, and the contact rings are fixedly connected to the rotor housing the field coils.

A cap, which may be connected to the outer angular ball bearing, includes a bushing for receiving an angular ball bearing. This bearing enables the supported rotation of the outer hollow-chamber rotor on the inner hollow-chamber rotor in the angular-ball bearing located in the outer bearing chamber rotor.

The final cover may be attached to the cap in order to fix the angular ball bearing located in the interior of the cap and the inner chamber rotor. The cover is provided with a flange for connecting rotor blades or turbines.

In some embodiments a shell covering, casing, or other like type of covering may be fixed on the fixed center shaft 107. The shell covering may be made from metal, plastic or other synthetic material, and may be fastened by a sprung ring or other like fastening means. The plate is provided with the contact pins and connection cable. The generated electrical energy is transmitted via the contact pins to a multi-conductor cable which is connected via the contact rings located on the outer hollow-chamber rotor 109.

Various embodiments of the counter-rotating electrical generator may be constructed from a number of components, including for example:

COMPONENT REFERENCE LIST a. Internal hollow chamber rotor
b. Magnets
c. Bushing for angular ball bearings
d. Central hollow chamber axis
e. External hollow chamber rotor
f. Contact rings
g. Field coils
h. Angular ball bearing large
i. Angular ball bearing small
j. Lid
k. Flange for turbines
l. Bowl
m. Contact pins
n. Connection cable
o. Cap The embodiments described above in this disclosure have been discussed in terms of a first outer hollow-chamber rotor that contains one or more magnets, and a second inner hollow-chamber rotor that contains windings. As the first and second hollow-chamber rotors rotate in opposite directions the windings pass through the magnetic field created by the magnet, thus generating electricity. However, in some embodiments the inner hollow-chamber rotor may be configured with magnets and the outer hollow-chamber rotor may have the windings. In yet other embodiments there are three or more hollow-chamber rotors, one with magnets and the others having windings.

The embodiments have been described in terms of the outer rotor rotating in a clockwise direction while the inner rotor rotates in a counter clockwise direction. However, the embodiments generate electricity regardless of which direction with rotors rotate—so long as they rotate in the opposite direction. In fact, the various embodiments will generate electricity if one rotor is held stationary while the other rotates in either direction. Further, it is not necessary that both rotors rotate at the same rotational velocity. One rotor may be configured to rotate faster, or slower, than the other. In some of the embodiments the rotation speed of one, or both, the rotors may be adjusted. For example, if the rotors are driven by the blades of a wind turbine, the blades of one or both wind turbines may be adjusted to provide different speeds for the two rotors.

The terminology used herein is for the purpose of describing particular embodiments only and is not intended to be limiting of the invention. As used in the specification and claims the term "substantially" means plus or minus (+/−) ten percent. For example, "substantially one inch" means "one inch plus or minus ten percent." As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "plurality", as used herein and in the claims, means two or more of a named element. It should not, however, be interpreted to necessarily refer to every instance of the named element in the entire device. Particularly, if there is a reference to "each" element of a "plurality" of elements. There may be additional elements in the entire device that are not be included in the "plurality" and are not, therefore, referred to by "each."

The corresponding structures, materials, acts, and equivalents of all means or step plus function elements, if any, in the claims below are intended to include any structure, material, or act for performing the function in combination with other claimed elements as specifically claimed. The disclosure of the various embodiments have been presented for purposes of illustration and description, and is not intended to be exhaustive in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated. The description of the various embodiments provided above is illustrative in nature inasmuch as it is not intended to limit the invention, its application, or uses. Thus, variations that do not depart from the intents or purposes of the invention are encompassed by the various embodiments of the present invention. Such variations are not to be regarded as a departure from the intended scope of the present invention.

What is claimed:

1. A counter-rotating electrical generator, comprising:
   a center shaft oriented along a central axis;
   a first rotor rotatably mounted on said center shaft and being configured to rotate in a first rotational direction about the central axis, the first rotor being configured with two or more magnets;
   a second rotor rotatably mounted on said center shaft and being configured to rotate about the central axis in a second rotational direction opposite the first rotational direction, the second rotor being configured with at least one winding;
   a first flange connected to said first rotor configured to be rotated in the first rotational direction by a source of mechanical force; and
   a second flange connected to said second rotor configured to be rotated in the second rotational direction by said source of mechanical force;
   wherein electricity is generated from said at least one winding of the second rotor passing through a rotating magnetic field from said at least one magnet of the first rotor;
   wherein one of the first rotor and the second rotor is an outer hollow-chamber rotor; and
   wherein one of the first rotor and the second rotor is an inner hollow-chamber rotor positioned concentric to and inside of said outer hollow-chamber rotor.

2. The counter-rotating electrical generator of claim 1, wherein the center shaft is fixed in position relative to said counter-rotating electrical generator.

3. The counter-rotating electrical generator of claim 1, wherein the first rotor is the outer hollow-chamber rotor; and
   wherein the second rotor is the inner hollow-chamber rotor positioned concentric to and inside of said outer hollow-chamber rotor.

4. The counter-rotating electrical generator of claim 1, wherein:
   each of said two or more magnets has a north pole and a south pole.

5. The counter-rotating electrical generator of claim 4, wherein said two or more magnets are electro magnets.

6. The counter-rotating electrical generator of claim 4, wherein said at least one winding of the inner hollow-chamber rotor comprises:
   two or more windings within a hollow chamber of said inner hollow-chamber rotor.

7. The counter-rotating electrical generator of claim 1, wherein the first rotational direction is clockwise and the second rotational direction is counter clockwise.

8. The counter-rotating electrical generator of claim 1, further comprising:
   wherein the first flange is configured to be connected to a first source of rotational mechanical torque; and
   wherein the second flange is configured to be connected to a second source of rotational mechanical torque.

9. The counter-rotating electrical generator of claim 8, wherein the source of mechanical force is wind from a given direction;
   wherein the first source of rotational mechanical torque is first wind turbine blades oriented to be driven in the first rotational direction in response to wind from the given direction; and
   wherein the second source of rotational mechanical torque is second wind turbine blades oriented to be driven in the second rotational direction in response to the wind from said given direction.

10. The counter-rotating electrical generator of claim 9, wherein the first flange includes means for attaching, said means for attaching being configured for attaching the first wind turbine blades to the first flange; and
    wherein the second flange includes the means for attaching, said means for attaching being configured for attaching the second wind turbine blades to the second flange.

11. The counter-rotating electrical generator of claim 10, wherein the means for attaching are bolt holes.

12. The counter-rotating electrical generator of claim 1, further comprising:
    a shell covering attached to said center shaft.

13. The counter-rotating electrical generator of claim 1, wherein the first rotor is configured to rotate at a different rate than the second rotor.

14. The counter-rotating electrical generator of claim 1, wherein the first rotor is driven to rotate in the first rotational direction while the second rotor is driven to rotate in the second rotational direction.

15. The counter-rotating electrical generator of claim 1, wherein the center shaft is the only shaft of the counter-rotating electrical generator.

* * * * *